United States Patent
Xu (10) Patent No.: US 11,958,502 B2
(45) Date of Patent: Apr. 16, 2024

(54) FOREIGN OBJECT DETECTION WITH SURFEL MAPS

(71) Applicant: Waymo LLC, Mountain View, CA (US)

(72) Inventor: Zhinan Xu, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 254 days.

(21) Appl. No.: 17/037,017

(22) Filed: Sep. 29, 2020

(65) Prior Publication Data

US 2022/0097731 A1 Mar. 31, 2022

(51) Int. Cl.
| | |
|---|---|
| B60W 60/00 | (2020.01) |
| B60W 30/09 | (2012.01) |
| B60W 30/095 | (2012.01) |
| G01C 21/32 | (2006.01) |
| G01C 21/34 | (2006.01) |
| G06F 18/22 | (2023.01) |
| G06V 20/58 | (2022.01) |

(52) U.S. Cl.
CPC ........ *B60W 60/0015* (2020.02); *B60W 30/09* (2013.01); *B60W 30/0956* (2013.01); *G01C 21/32* (2013.01); *G01C 21/3461* (2013.01); *G06F 18/22* (2023.01); *G06V 20/58* (2022.01)

(58) Field of Classification Search
None
See application file for complete search history.

(56) References Cited

U.S. PATENT DOCUMENTS

| | | | |
|---|---|---|---|
| 10,921,817 B1* | 2/2021 | Kangaspunta | G01S 17/86 |
| 11,370,424 B1* | 6/2022 | Cohen | B60W 30/09 |
| 2019/0369212 A1* | 12/2019 | Dylewski | G01S 17/87 |
| 2021/0053561 A1* | 2/2021 | Beller | G08G 1/166 |
| 2021/0157321 A1* | 5/2021 | Wang | G01S 7/4808 |
| 2021/0229656 A1* | 7/2021 | Dax | B60W 30/0956 |
| 2021/0318123 A1* | 10/2021 | Cui | G01C 21/3837 |
| 2022/0205809 A1* | 6/2022 | Mayster | B60W 40/06 |

OTHER PUBLICATIONS

Stuckler et al., "Efficient Mobile Robot Navigation using 3D Surfel Grid Maps," In Proc. of the German Conferenceon Robotics, May 2012, 5 pages (Year: 2012).*

(Continued)

*Primary Examiner* — Vivek D Koppikar
*Assistant Examiner* — David Ruben Pedersen
(74) *Attorney, Agent, or Firm* — Fish & Richardson P.C.

(57) ABSTRACT

Methods, systems, and apparatus, including computer programs encoded on computer storage media, for detecting foreign objects using a surfel map. One of the methods includes receiving sensor data representing reflection characteristics of electromagnetic waves in an operating environment of an autonomous vehicle. A surfel map representing a portion of the operating environment of the autonomous vehicle is used to determine that the reflection data includes one or more mismatched reflection characteristics for a particular surfel in the surfel map. In response, a foreign object is detected at a location corresponding to the particular surfel having the one or more mismatched reflection characteristics.

20 Claims, 6 Drawing Sheets

(56) References Cited

OTHER PUBLICATIONS

Behley et al., "Efficient Surfel-Based SLAM using 3D Laser Range Data in Urban Environments," Robotics: Science and Systems, 2018, 10 pages.
Park et al., "Probabilistic Surfel Fusion for Dense LiDAR Mapping," Proceedings of the IEEE International Conference on Computer Vision, 2017, pp. 2418-2426.
Pfister et al., "Surfels: surface elements as rendering primitives," Proceedings of the 27th annual conference on Computer graphics and interactive techniques, 2000, pp. 335-342.
Schops et al., "SurfelMeshing: Online Surfel-Based Mesh Reconstruction," CoRR, Oct. 2018, arxiv.org/abs/1810.00729v1, 13 pages.
Stuckler et al., "Efficient Mobile Robot Navigation using 3D Surfel Grid Maps," In Proc. of the German Conference on Robotics, May 2012, 5 pages.
Stuckler et al., "Multi-Resolution Surfel Maps for Efficient Dense 3D Modeling and Tracking," Journal of Visual Communication and Image Representation, Jan. 2014, 25(1): 137-147.
Wang et al., "Real-time Scalable Dense Surfel Mapping," 2019 International Conference on Robotics and Automation, May 2019, pp. 6919-6925.

\* cited by examiner

FOREIGN OBJECT DETECTION WITH SURFEL MAPS

BACKGROUND

This specification relates to automatic planning of autonomous vehicle driving decisions.

Autonomous vehicles include self-driving cars, boats, and aircraft. Autonomous vehicles use a variety of on-board sensors in tandem with map representations of the environment in order to make control and navigation decisions.

Some vehicles use a two-dimensional or a 2.5-dimensional map to represent characteristics of the operating environment. A two-dimensional map associates each location, e.g., as given by latitude and longitude, with some properties, e.g., whether the location is a road, or a building, or an obstacle. A 2.5-dimensional map additionally associates a single elevation with each location. However, such 2.5-dimensional maps are problematic for representing three-dimensional features of an operating environment that might in reality have multiple elevations. For example, overpasses, tunnels, trees, and lamp posts all have multiple meaningful elevations within a single latitude/longitude location on a map.

One difficult problem for autonomous vehicle planning is foreign object and debris (FOD) detection. For brevity, in this specification foreign objects and debris will simply be referred to as "foreign objects." Foreign objects are non-permanent objects that a vehicle can safely ignore for the purposes of path planning. For example, a vehicle can safely ignore leaves and small items of trash in a roadway. Ideally, an autonomous vehicle should not aggressively swerve or brake when encountering these types of objects. Doing so affects travel time, greatly reduces ride comfort, and increases wear and tear on a vehicle.

However, many other kinds of objects do need to be considered for path planning, such as pedestrians, cyclists, animals, and other large objects. In general it is extremely difficult to classify, in real time, an unknown object as a foreign object that can be ignored or as another kind of object that should be taken into consideration when performing path planning. If the sensitivity to foreign objects is too high, an autonomous vehicle might for example brake hard for a pile of leaves. If sensitivity is too low, safety around pedestrians and cyclists can be compromised.

SUMMARY

This specification describes how a vehicle, e.g., an autonomous or semi-autonomous vehicle, can use a surfel map for performing foreign object detection with high accuracy. Because the surfel map provides a high-fidelity representation of surfaces in an environment, a vehicle can perform highly accurate foreign object detection, which allows for smoother and faster vehicle operation without compromising safety. In addition, the rich elevation data of a surfel map can also help a vehicle to quickly discriminate between foreign objects that should be avoided and foreign objects that can be ignored.

Particular embodiments of the subject matter described in this specification can be implemented so as to realize one or more of the following advantages.

Using a surfel map for foreign object detection improves capabilities of a vehicle for identifying foreign objects without compromising safety of passengers, other motorists, or pedestrians. The rich elevation data of a surfel map allows the vehicle to very quickly identify which objects can be ignored and which should be accounted for in a new driving plan. This data provides additional options that result in enhanced planning capabilities. As one example, the system can treat the same foreign object in different ways depending on current traffic conditions.

The techniques described in this specification also provide additional advantages. For example, a system can instead leverage a three-dimensional surfel map to make autonomous driving decisions. The three-dimensional surfel map allows multiple different elements at respective altitudes for each (latitude, longitude) coordinate in the environment, yielding a more accurate and flexible representation of the environment.

Some existing systems rely entirely on existing representations of the world, generated offline using sensor data generated at previous time points, to navigate through a particular environment. These systems can be unreliable, because the state of the environment might have changed since the representation was generated offline or since the environment was last observed. Some other existing systems rely entirely on sensor data generated by the vehicle at the current time point to navigate through a particular environment. These systems can be inefficient, because they fail to leverage existing knowledge about the environment that the vehicle or other vehicles have gathered at previous time points. Using techniques described in this specification, an on-board system can combine an existing surfel map and online sensor data to generate a prediction for the state of the environment. The existing surfel data allows the system to get a jump-start on the prediction and plan ahead for regions that are not yet in the range of the sensors of the vehicle, while the sensor data allows the system to be agile to changing conditions in the environment.

Using a surfel representation to combine the existing data and the new sensor data can be particularly efficient with respect to the time, memory, and processing power required. Using techniques described in this specification, a system can quickly integrate new sensor data with the data in the surfel map to generate a representation that is also a surfel map. This process is especially time- and memory-efficient because surfels require relatively little bookkeeping, as each surfel is an independent entity. Existing systems that rely, e.g., on a 3D mesh cannot integrate sensor data as seamlessly because if the system moves one particular vertex of the mesh, then the entire mesh is affected; different vertices might cross over each other, yielding a crinkled mesh that must be untangled. Updating the mesh can therefore be a lengthy and computationally expensive process.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes how a vehicle, e.g., an autonomous or semi-autonomous vehicle, can use a surfel map to improve foreign object detection. In this specification, foreign objects are non-permanent objects near or on drivable surfaces of a planned path of travel of an autonomous vehicle that the vehicle can safely ignore for the purposes of path planning. Example foreign objects include leaves, grass clippings, twigs, pieces of paper, plastic bags, pieces of trash, and small stones, to name just a few examples. In this specification, a drivable surface is any appropriate surface on which an autonomous vehicle can travel, which includes roads, highways, driveways, on ramps, parking lots, and parking garages, to name just a few examples.

To detect foreign objects using a surfel map, a vehicle can compare reflection characteristics from current sensor data with existing surfel data about nearby drivable surfaces in the surfel map. A mismatch of reflection characteristics for a particular surfel representing a drivable surface can indicate the presence of a foreign object at a location corresponding to the particular surfel. In addition, because a surfel map can richly represent elevations in an operating environment, the vehicle can make more sophisticated decisions about what to do about the foreign object. In some situations, a vehicle planning system may decide to avoid a foreign object, such as a cardboard box, to minimize the risk of vehicle damage. But in other situations, such as when other vehicles are nearby, the vehicle planning system can decide to continue the current path of travel to maximize safety.

In this specification, a surfel is data that represents a two-dimensional surface that corresponds to a particular three-dimensional coordinate system in an environment. A surfel can include data representing a position and an orientation of the two-dimensional surface in the three-dimensional coordinate system. The position and orientation of a surfel can be defined by a corresponding set of coordinates. For example, a surfel can be defined by spatial coordinates, e.g., (x,y,z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g., a vector with a magnitude of 1, that defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples. In some implementations, different surfels in a surfel map can have different sizes, so that a surfel map can have varying levels of granularity depending on the environment described by the surfel map; e.g., large surfels can corresponds to large, flat areas of the environment, while smaller surfels can represent areas of the environment that require higher detail.

In this specification, a surfel map is a collection of surfels that each correspond to a respective location in the same environment. The surfels in a surfel map collectively represent the surface detections of objects in the environment. In some implementations, each surfel in a surfel map can have additional data associated with it, e.g., one or more labels describing the type of surface or object represented by the surfel. As a particular example, if a surfel map represents a portion of a city block, then each surfel in the surfel map can have a semantic label identifying the type of object represented by the surfel, e.g., "streetlight," "stop sign," or "mailbox," to name just a few examples. As another example, a surfel map can associate each surfel with an indication of whether it represents a drivable surface or not.

The system can determine that a surfel represents a drivable surface in multiple different ways. For example, the system can determine that all surfels having a particular semantic label, e.g., "road," "highway," or "driveway," are surfels representing drivable surfaces.

Alternatively or in addition, the system can determine that surfels that are near paths on a road graph are surfels representing drivable surfaces. In this specification, a road graph is data that represents paths that can be traveled by vehicles in a particular environment. For example, the paths defined by a road graph can define boundaries of vehicle routes, lane demarcations, paths within lanes, intersections, or some combination of these. Thus, surfels that lie along or near a path defined a road graph can be considered by the system to be surfels that represent drivable surfaces, regardless of their labeling. The system can thus consider a surfel to represent a drivable surface if the surfel is within a threshold distance of a path defined by a road graph.

A surfel map can also associate each surfel with an indication of whether the surfel is near a drivable surface or not. It can be useful to discriminate between foreign objects and other kinds of objects in locations that are near a roadway. For example, if a foreign object is detected on a sidewalk, it can be useful to determine if the foreign object is a piece of paper or an animal. In the former case, the vehicle need not consider the piece of paper for path planning, but in the latter case, the vehicle might consider it.

Each surfel can also be associated with reflection characteristics. Reflection characteristics represent one or more predicted properties of a surface represented by the surfel. For example, reflection characteristics can include any appropriate property of electromagnetic waves that reflect off of surfaces, including measurements of the objects material (BRDF), measures of reflectivity, color, brightness, and transparency, to name just a few examples. In some cases, the orientation of a surfel can also be considered part of the reflection characteristics. The reflection characteristics associated with a surfel can be generated by a single sensor or multiple different sensors. For, example, a lidar sensor can measure the reflectivity of a surface at a non-visible wavelength, while a camera can capture its color in the visible spectrum. The reflection characteristics of a surfel can be represented with multiple discrete values or as a continuous distribution. For example, a surfel can be associated with a high probability that it is opaque and a low probability that it is transparent.

A surfel map can characterize a real-world environment, e.g., a particular portion of a city block in the real world, or a simulated environment, e.g., a virtual intersection that is used to simulate autonomous driving decisions to train one or more machine learning models. As a particular example, a surfel map characterizing a real-world environment can be generated using sensor data that has been captured by sensors operating in the real-world environment, e.g., sensors on-board a vehicle navigating through the environment. In some implementations, an environment can be partitioned into multiple three-dimensional volumes, e.g., a three-dimensional grid of cubes of equal size, and a surfel map characterizing the environment can have at most one surfel corresponding to each volume.

After the surfel map has been generated, e.g., by combining sensor data gathered by multiple vehicles across multiple trips through the real-world, one or more systems on-board a vehicle can receive the generated surfel map. Then, when navigating through a location in the real world that is represented by the surfel map, the vehicle can process the surfel map along with real-time sensor measurements of the environment in order to make better decisions regarding foreign objects than if the vehicle were to rely solely on the real-time sensor measurements.

Figure 1:
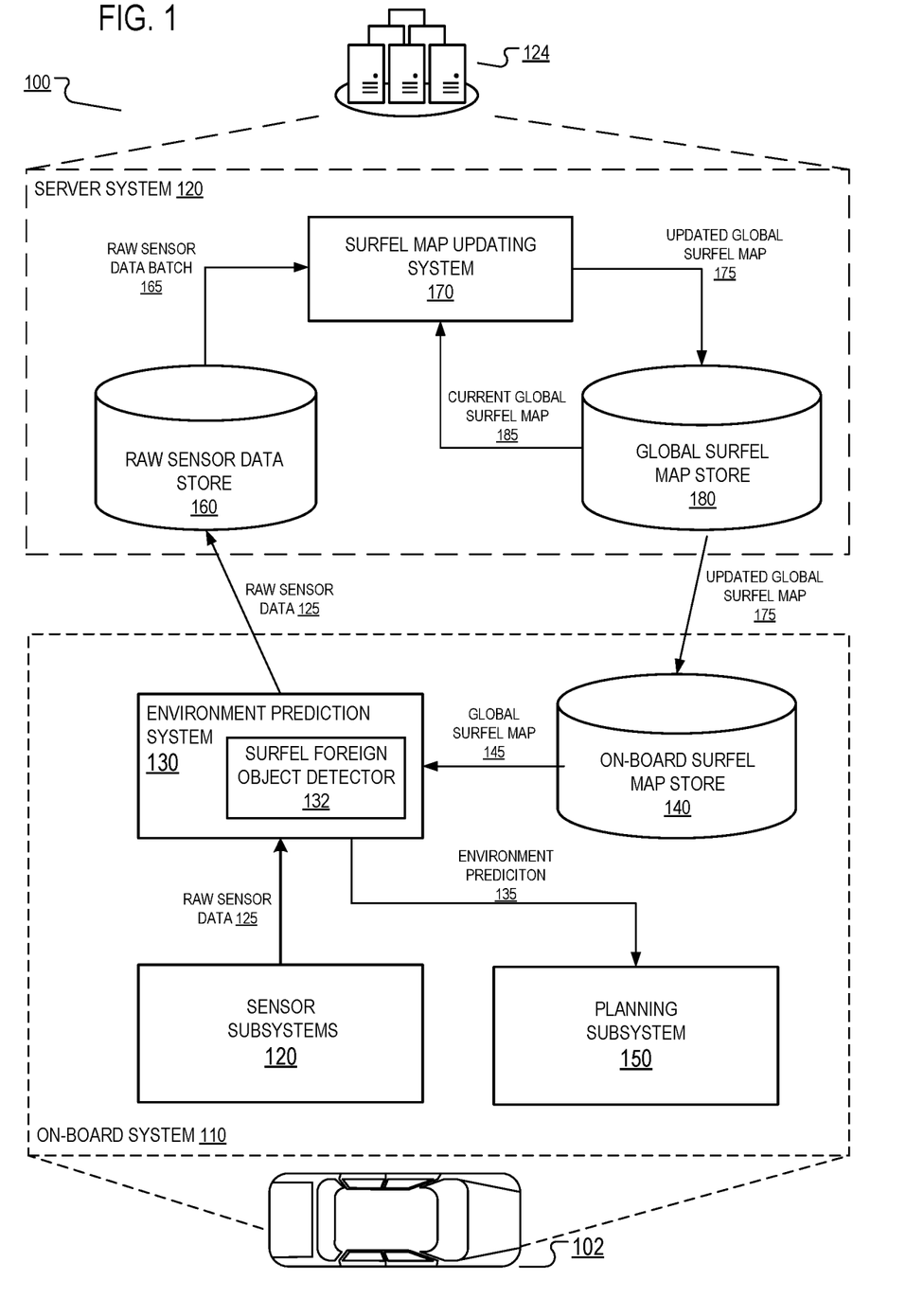
FIG. 1 is a diagram of an example system.

FIG. 1 is a diagram of an example system 100. The system 100 can include multiple vehicles, each with a respective on-board system. For simplicity, a single vehicle 102 and its on-board system 110 is depicted in FIG. 1. The system 100 also includes a server system 120 which every vehicle in the system 100 can access.

The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g., an object or another vehicle represented in a surfel map. The on-board system 110 includes one or more sensor subsystems 120. The sensor subsystems 120 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 120 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 120 classify one or more groups of raw sensor measurements as being measures of a respective object of a particular type, the sensor subsystems 120 can compile the raw sensor measurements into a set of raw sensor data 125, and send the raw data 125 to an environment prediction system 130.

The on-board system 110 also includes an on-board surfel map store 140 that stores a global surfel map 145 of the real-world. The global surfel map 145 is an existing surfel map that has been generated by combining sensor data captured by multiple vehicles navigating through the real world.

Generally, every vehicle in the system 100 uses the same global surfel map 145. In some cases, different vehicles in the system 100 can use different global surfel maps 145, e.g., when some vehicles have not yet obtained an updated version of the global surfel map 145 from the server system 120.

Each surfel in the global surfel map 145 can have associated data that encodes multiple classes of semantic information for the surfel. For example, for each of the classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel, e.g., "pole" with probability 0.8, "street sign" with probability 0.15, and "fire hydrant" with probability 0.05.

The environment prediction system 130 can receive the global surfel map 145 and combine it with the raw sensor data 125 to generate an environment prediction 135. The environment prediction 135 includes data that characterizes a prediction for the current state of the environment, including predictions for an object or surface at one or more locations in the environment.

The raw sensor data 125 might show that the environment through which the vehicle 102 is navigating has changed. In some cases, the changes might be large and discontinuous, e.g., if a new building has been constructed or a road has been closed for construction since the last time the portion of the global surfel map 145 corresponding to the environment has been updated. In some other cases, the changes might be small and continuous, e.g., if a bush grew by an inch or a leaning pole increased its tilt. In either case, the raw sensor data 125 can capture these changes to the world, and the environment prediction system 130 can use the raw sensor data to update the data characterizing the environment stored in the global surfel map 145 to reflect these changes in the environment prediction 135.

For one or more objects represented in the global surfel map 145, the environment prediction system 130 can use the raw sensor data 125 to determine a probability that the object is currently in the environment. In some implementations, the environment prediction system 130 can use a Bayesian model to generate the predictions of which objects are currently in the environment, where the data in the global surfel map 145 is treated as a prior distribution for the state of the environment, and the raw sensor data 125 is an observation of the environment. The environment prediction system 130 can perform a Bayesian update to generate a posterior belief of the state of the environment, and include this posterior belief in the environment prediction 135. In some implementations, the raw sensor data 125 also has a probability distribution for each object detected by the sensor subsystem 120 describing a confidence that the object is in the environment at the corresponding location; in some other implementations, the raw sensor data 125 includes detected objects with no corresponding probability distribution.

For example, if the global surfel map 145 includes a representation of a particular object, and the raw sensor data 125 includes a strong detection of the particular object in the same location in the environment, then the environment prediction 135 can include a prediction that the object is in the location with high probability, e.g., 0.95 or 0.99. If the global surfel map 145 does not include the particular object, but the raw sensor data 125 includes a strong detection of the particular object in the environment, then the environment prediction 135 might include a weak prediction that the object is in the location indicated by the raw sensor data 125, e.g., predict that the object is at the location with probability of 0.5 or 0.6. If the global surfel map 145 does include the particular object, but the raw sensor data 125 does not include a detection of the object at the corresponding location, or includes only a weak detection of the object, then the environment prediction 135 might include a prediction that has moderate uncertainty, e.g., assigning a 0.7 or 0.8 probability that the object is present.

That is, the environment prediction system 130 might assign more confidence to the correctness of the global surfel map 145 than to the correctness of the raw sensor data 125. In some other implementations, the environment prediction system 130 might assign the same or more confidence to the correctness of the sensor data 125 than to the correctness of the global surfel map 145. In either case, the environment prediction system 130 need not treat the raw sensor data 125 or the global surfel map 145 as a ground-truth, but can rather associate uncertainty with both in order to combine them. Approaching each input in a probabilistic manner can generate a more accurate environment prediction 135, as the raw sensor data 125 might have errors, e.g., if the sensors in the sensor subsystems 120 are miscalibrated, and the global surfel map 145 might have errors, e.g., if the state of the world has changed.

In some implementations, the environment prediction 135 can also include a prediction for each class of semantic information for each object in the environment. For example, the environment prediction system 130 can use a Bayesian model to update the associated data of each surfel in the global surfel map 145 using the raw sensor data 125 in order to generate a prediction for each semantic class and for each object in the environment. For each particular object represented in the global surfel map 145, the environment prediction system 130 can use the existing labels of semantic information of the surfels corresponding to the particular object as a prior distribution for the true labels for the particular object. The environment prediction system 130 can then update each prior using the raw sensor data 125 to generate posterior labels and associated probabilities for each class of semantic information for the particular object. In some such implementations, the raw sensor data 125 also has a probability distribution of labels for each semantic class for each object detected by the sensor subsystem 120; in some other such implementations, the raw sensor data 125 has a single label for each semantic class for each detected object.

Continuing the previous particular example, where a particular surfel characterizes a pole with probability 0.8, a street sign with probability 0.15, and fire hydrant with probability 0.05, if the sensor subsystems 120 detect a pole at the same location in the environment with high probability, then the Bayesian update performed by the environment prediction system 130 might generate new labels indicating that the object is a pole with probability 0.85, a street sign with probability 0.12, and fire hydrant with probability 0.03. The new labels and associated probabilities for the object are added to the environment prediction 135.

The environment prediction system 130 can include a surfel foreign object detector 132, which is a module or subsystem that is configured to detect foreign objects by comparing sensor data 125 to the global surfel map 145. As part of this process, the foreign object detector 132 can determine that there is a mismatch between one or more reflection characteristics associated with a surfel and the actual obtained sensor data. Techniques for discriminating between foreign objects that can be ignored for planning purposes and other types of objects that should be taken into consideration are described in more detail below.

The environment prediction system 130 can provide the environment prediction 135, which can include whether or not foreign objects have been detected and one or more of their properties, to a planning subsystem 150, which can use the environment prediction 130 to make autonomous driving decisions, e.g., generating a planned trajectory for the vehicle 102 through the environment. As one example, the planning subsystem 150 can determine that the foreign object is of a type that does not require altering a plan. As another example, the planning subsystem 150 can determine to alter a plan even if not required, e.g., to minimize risk of damage to the vehicle.

The environment prediction system 130 can also provide the raw sensor data 125 to a raw sensor data store 160 located in the server system 120.

The server system 120 is typically hosted within a data center 124, which can be a distributed computing system having hundreds or thousands of computers in one or more locations.

The server system 120 includes a raw sensor data store 160 that stores raw sensor data generated by respective vehicles navigating through the real world. As each vehicle captures new sensor data characterizing locations in the real world, each vehicle can provide the sensor data to the server system 120. The server system 120 can then use the sensor data to update the global surfel map that every vehicle in the system 100 uses. That is, when a particular vehicle discovers that the real world has changed in some way, e.g., construction has started at a particular intersection or a street sign has been taken down, the vehicle can provide sensor data to the server system 120 so that the rest of the vehicles in the system 100 can be informed of the change.

The server system 120 also includes a global surfel map store 180 that maintains the current version of the global surfel map 185.

A surfel map updating system 170, also hosted in the server system 120, can obtain the current global surfel map 185 and a batch of raw sensor data 165 from the raw sensor data store 160 in order to generate an updated global surfel map 175. In some implementations, the surfel map updating system 170 updates the global surfel map at regular time intervals, e.g., once per hour or once per day, obtaining a batch of all of the raw sensor data 165 that has been added to the raw sensor data store 160 since the last update. In some other implementations, the surfel map updating system 170 updates the global surfel map whenever a new raw sensor data 125 is received by the raw sensor data store 160.

In some implementations, the surfel map updating system 170 generates the updated global surfel map 175 in a probabilistic way.

In some such implementations, for each measurement in the batch of raw sensor data 165, the surfel map updating system 170 can determine a surfel in the current global surfel map 185 corresponding to the location in the environment of the measurement, and combine the measurement with the determined surfel. For example, the surfel map updating system 170 can use a Bayesian model to update the associated data of a surfel using a new measurement, treating the associated data of the surfel in the current global surfel map 185 as a prior distribution. The surfel map updating system 170 can then update the prior using the measurement to generate posterior distribution for the corresponding location. This posterior distribution is then included in the associated data of the corresponding surfel in the updated global surfel map 175.

If there is not currently a surfel at the location of a new measurement, then the surfel map updating system 170 can generate a new surfel according to the measurement.

In some such implementations, the surfel map updating system 170 can also update each surfel in the current global surfel map 185 that did not have a corresponding new measurement in the batch of raw sensor data 165 to reflect a lower certainty that an object is at the location corresponding to the surfel. In some cases, e.g., if the batch of raw sensor data 165 indicates a high confidence that there is not an object at the corresponding location, the surfel map updating system 170 can remove the surfel from the updated global surfel map 175 altogether. In some other cases, e.g., when the current global surfel map 185 has a high confidence that the object characterized by the surfel is permanent and therefore that the lack of a measurement of the object in the batch of raw sensor data 165 might be an error, the surfel map updating system 170 might keep the surfel in the updated global surfel map 175 but decrease the confidence of the updated global surfel map 175 that an object is at the corresponding location.

After generating the updated global surfel map 175, the surfel map updating system 170 can store it in the global surfel map store 180, replacing the stale global surfel map 185. Each vehicle in the system 100 can then obtain the updated global surfel map 175 from the server system 120, e.g., through a wired or wireless connection, replacing the stale version with the retrieved updated global surfel map 175 in the on-board surfel map store 140. In some implementations, each vehicle in the system 100 retrieves an updated global surfel map 175 whenever the global surfel map is updated and the vehicle is connected to the server system 120 through a wired or wireless connection. In some other implementations, each vehicle in the system 100 retrieves the most recent updated global surfel map 175 at regular time intervals, e.g., once per day or once per hour.

Figure 2A:
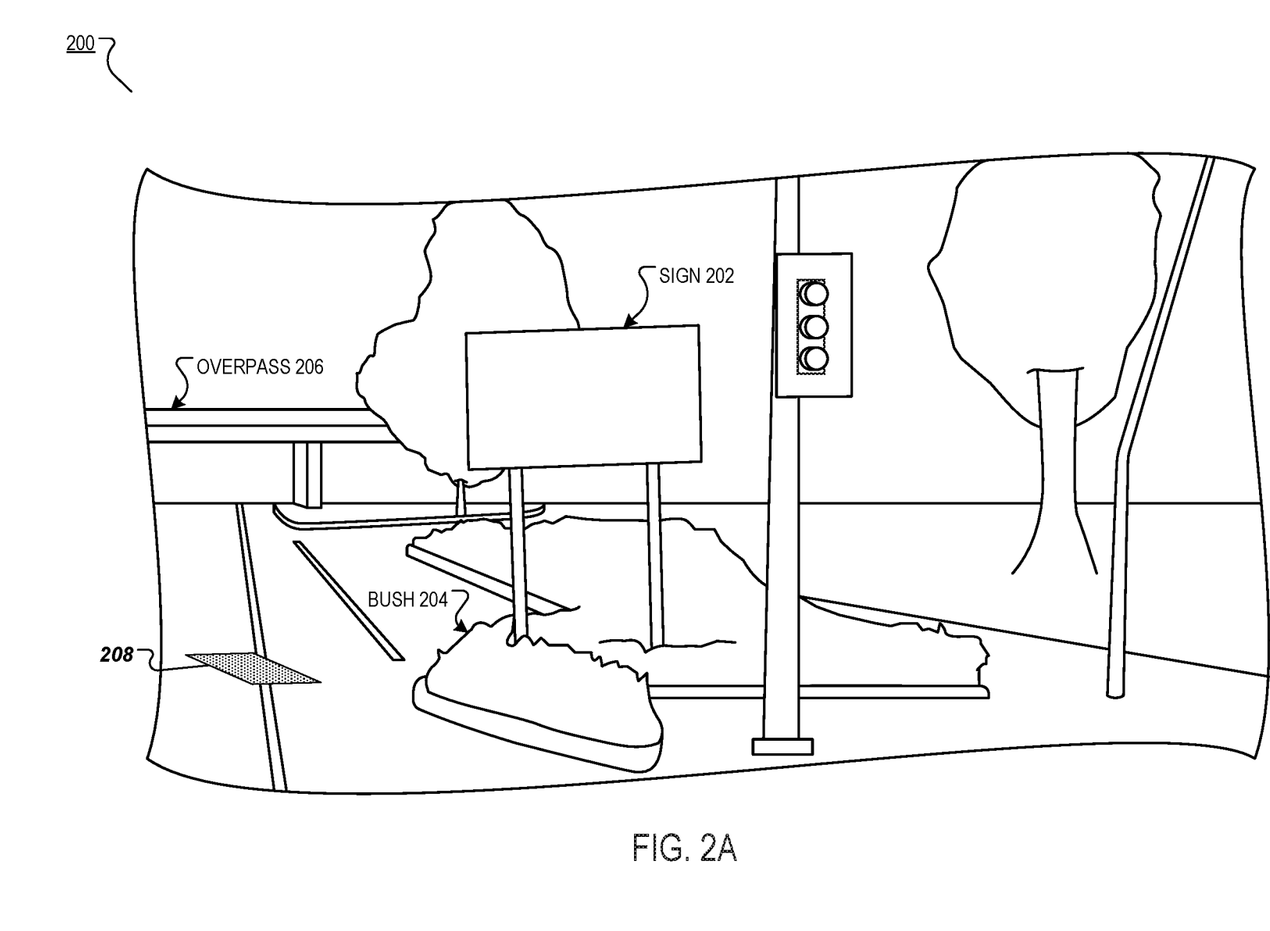
FIG. 2A is an illustration of an example environment.

FIG. 2A is an illustration of an example operating environment 200. The environment 200 is depicted from the point of view of a sensor, e.g., a camera, on-board a vehicle navigating through the environment 200. The environment 200 includes a sign 202, a bush 204, an overpass 206, and a piece of paper 208 in a roadway.

Figure 2B:
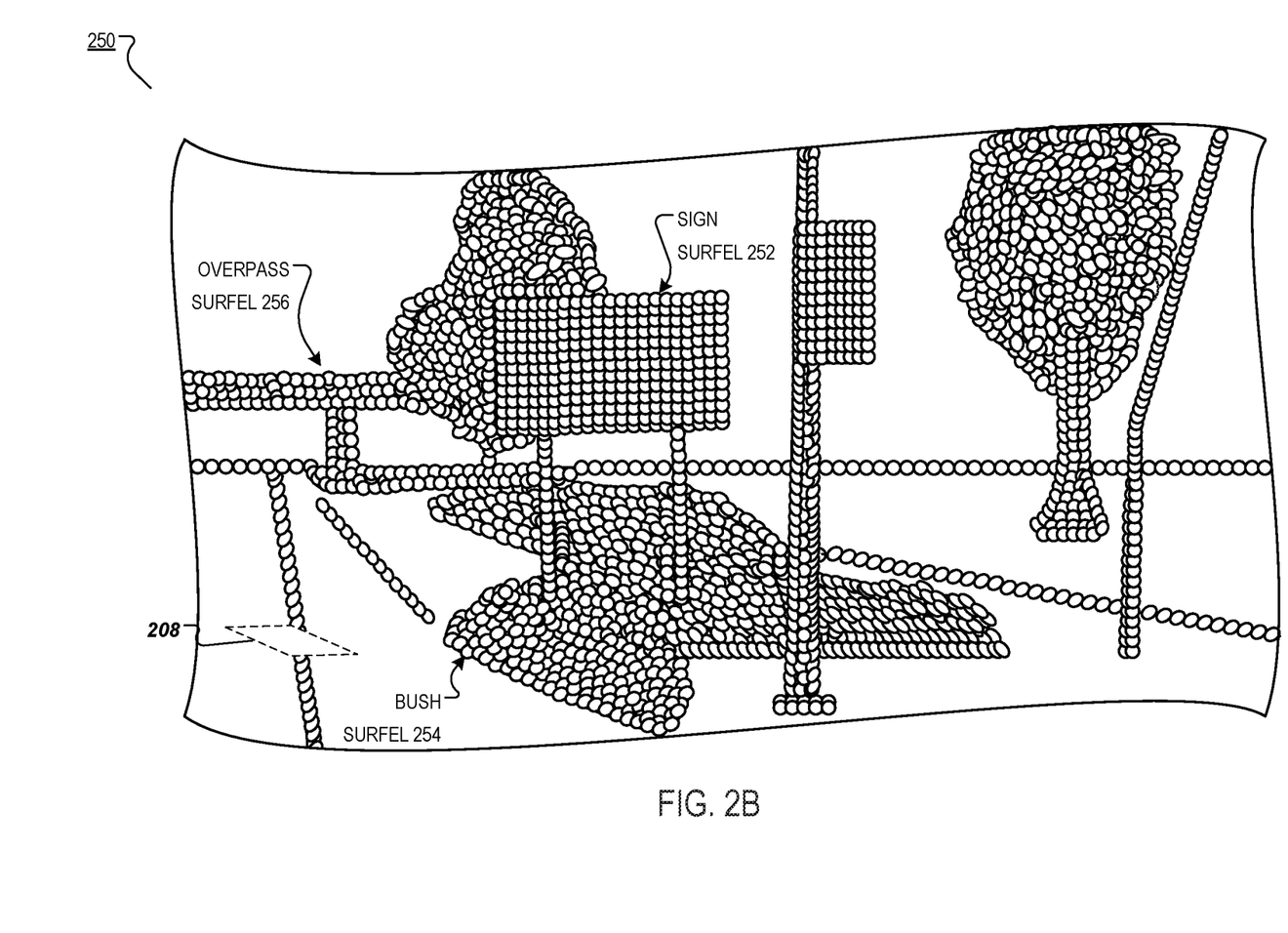
FIG. 2B is an illustration of an example surfel map of the environment of FIG. 2A.

FIG. 2B is an illustration of an example surfel map 250 of the environment 200 of FIG. 2A. Notably, the piece of paper 208 will obscure reflection data for some of the surfels on the roadway. In this example, the surfel map is illustrated as having surfels to represent lane markers. However, a surfel map can also have surfels to represent the surfaces of all parts of a road or any other drivable surface. The onboard system can then use this mismatch of reflection characteristics to determine that the piece of paper 208 is a foreign object that does not require replanning.

Each surfels in the surfel map 250 is represented by a disk, and defined by three coordinates (latitude, longitude, altitude), that identify a position and an orientation of the surfel in a common coordinate system of the environment 200 and by a normal vector that identifies an orientation of the surfel. For example, each voxel can be defined to be the disk that extends some radius, e.g., 1, 10, 25, or 100 centimeters, around the (latitude, longitude, altitude) coordinate. In some other implementations, the surfels can be represented as other two-dimensional shapes, e.g., ellipsoids or squares.

The environment 200 can be partitioned into a grid of equal-sized voxels. Each voxel in the grid of the environment 200 can contain at most one surfel, where, e.g., the (latitude, longitude, altitude) coordinate of each surfel defines the voxel that the surfel occupies. That is, if there is a surface of an object at the location in the environment corresponding to a voxel, then there can be a surfel characterizing the surface in the voxel; if there is not a surface of an object at the location, then the voxel is empty. In some other implementations, a single surfel map can contain surfels of various different sizes that are not organized within a fixed spatial grid.

Each surfel in the surfel map 250 can have associated data characterizing semantic information for the surfel. For example, as discussed above, for each of multiple classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel.

As another particular example, each surfel can have multiple labels, with associated probabilities, predicting the permanence of the surface characterized by the surfel; for example, a "permanent" label might have a high associated probability for surfels characterizing buildings, while a "non-permanent" label might have a high probability for surfels characterizing parked cars. For example, a car may be parked in the same location for long enough to be included in an updated surfel map. And such updated information can actually be helpful for making driving decisions, even though in theory the car could be removed at any time. Other kinds of non-permanent objects that might be represented in the surfel map include bicycles, kiosks, fruit stands, and construction barrels, to name just a few examples.

Other classes of semantic information can include a color, reflectivity, or opacity of the object characterized by the surfel.

For example, the surfel map 250 includes a sign surfel 252 that characterizes a portion of the surface of the sign 202 depicted in FIG. 2A. The sign surfel 252 might have labels predicted that the type of the object characterized by the sign surfel 252 is "sign" with probability 0.9 and "billboard" with probability 0.1. Because street signs are relatively permanent objects, the "permanent" label for the sign surfel 252 might be 0.95. The sign surfel 252 might have color labels predicting the color of the sign 202 to be "green" with probability 0.8 and "blue" with probability 0.2. Because the sign 202 is completely opaque and reflects some light, an opacity label of the sign surfel 252 might predict that the sign is "opaque" with probability 0.99 and a reflectivity label of the sign surfel 252 might predict that the sign is "reflective" with probability 0.6.

As another example, the surfel map 250 includes a bush surfel 254 that characterizes a portion of the bush 204 depicted in FIG. 2A. The bush surfel 254 might have labels predicted that the type of the object characterized by the bush surfel 254 is "bush" with probability 0.75 and "tree" with probability 0.25. Because bushes can grow, be trimmed, and die with relative frequency, the "permanent" label for the bush surfel 254 might be 0.2. The bush surfel 254 might have color labels predicting the color of the bush 204 to be "green" with probability 0.7 and "yellow" with probability 0.3. Because the bush 204 is not completely opaque and does not reflect a lot of light, an opacity label of the bush surfel 254 might predict that the sign is "opaque" with probability 0.7 and a reflectivity label of the sign surfel 252 might predict that the sign is "reflective" with probability 0.4.

Note that, for any latitude and longitude in the environment 200, e.g., for any given (latitude, longitude) position in a plane running parallel to the ground of the environment 200, the surfel map 250 can include multiple different surfels each corresponding to a different altitude in the environment 200, as defined by the altitude coordinate of the surfel. This represents a distinction between some existing techniques that are "2.5-dimensional," i.e., techniques that only allow a map to contain a single point at a particular altitude for any given latitude and longitude in a three-dimensional map of the environment. These existing techniques can sometimes fail when an environment has multiple objects at respective altitudes at the same latitude and longitude in the environment. For example, such existing techniques would be unable to capture both the overpass 206 in the environment 200 and the road underneath the overpass 205. The surfel map, on the other hand, is able to represent both the overpass 206 and the road underneath the overpass 206, e.g., with an overpass surfel 256 and a road surfel 258 that have the same latitude coordinate and longitude coordinate but a different altitude coordinate.

Figure 3:
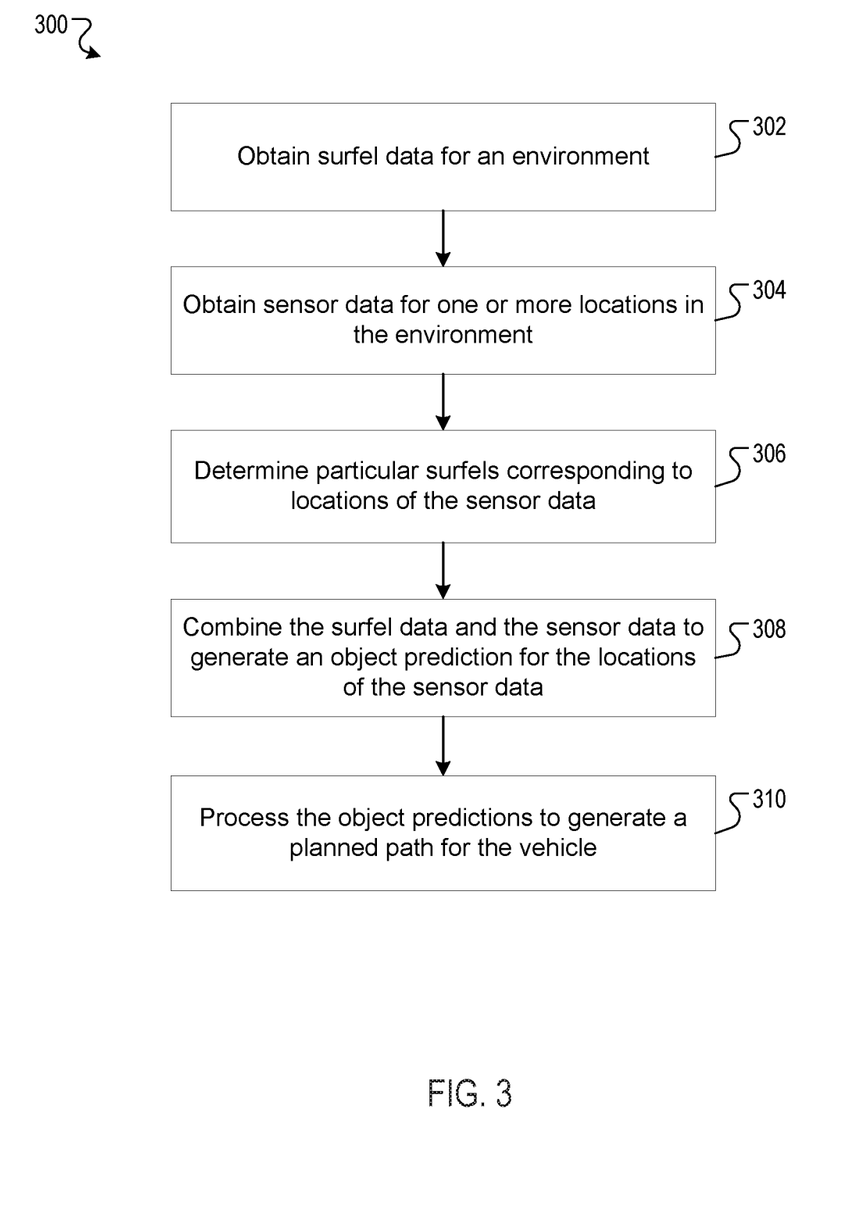
FIG. 3 is a flow diagram of an example process for combining surfel data and sensor data.

FIG. 3 is a flow diagram of an example process 300 for combining surfel data and sensor data. For convenience, the process 300 will be described as being performed by a system of one or more computers located in one or more locations. For example, an environment prediction system, e.g., the environment prediction system 130 depicted in FIG. 1, appropriately programmed in accordance with this specification, can perform the process 300.

The system obtains surfel data for an environment (step 302). The surfel data includes multiple surfels that each correspond to a respective different location in the environment. Each surfel in the surfel data can also have associated data. The associated data can include an uncertainty measure that characterizes a likelihood that the surface represented by the surfel is at the respective location of the surfel in the environment. That is, the uncertainty measure is a measure of how confident the system is that the surfel represents a surface that is actually in the environment at the current time point. For example, a surfel in the surfel map that represents a surface of a utility pole might have a relatively high uncertainty measure, because it is unlikely that the utility pole was removed between the time point at which the surfel map was created and the current time point. As another example, a surfel in the surfel map that represents a surface of a political campaign yard sign might have a relatively low uncertainty measure, because political campaign yard signs are usually temporary and therefore it is relatively likely that the yard sign has been removed between the time point at which the surfel map was created and the current time point.

The associated data of each surfel can also include a respective class prediction for each of one or more classes of semantic information for the surface represented by the surfel. In some implementations, the surfel data is represented using a voxel grid, where each surfel in the surfel data corresponds to a different voxel in the voxel grid.

The system obtains sensor data for one or more locations in the environment (step 304). The sensor data has been captured by one or more sensors of a vehicle navigating in the environment, e.g., the sensor subsystems 120 of the vehicle 102 depicted in FIG. 1.

In some implementations, the surfel data has been generated from data captured by one or more vehicles navigating through the environment at respective previous time points, e.g., the same vehicle that captured the sensor data and/or other vehicles.

The system determines one or more particular surfels corresponding to respective locations of the sensor data (step 306). For example, for each measurement in the sensor data, the system can select a particular surfel that corresponds to the same location as the measurement, if one exists in the surfel data.

The system combines the surfel data and the sensor data to generate an object prediction for each of the one or more locations of the sensor data (step 308). The object prediction for a particular location in the environment can include an updated uncertainty measure that characterizes likelihood that there is a surface of an object at the particular location.

In some implementations, the system performs a Bayesian update to generate the object prediction from the surfel data and sensor data. That is, the system can, for each location, determine that the associated data of the surfel corresponding to the location is a prior distribution for the object prediction, and update the associated data using the sensor data to generate the object prediction as the posterior distribution.

As a particular example, for each class of information in the surfel data to be updated, including the object prediction and/or one or more classes of semantic information, the system can update the probability associated with the class of information using Bayes' theorem:

$$P(H \mid E) = \frac{P(E \mid H)}{P(E)} \cdot P(H),$$

where H is the class of information (e.g., whether the object at the location is vegetation) and E is the sensor data. Here, P(H) is the prior probability corresponding to the class of information in the surfel data, and P(E|H) is probability of the sensors producing that particular sensor data given that the class of information is true. Thus, P(H|E) the posterior probability of the for the class of information. In some implementations, the system can execute this computation independently for each class of information.

For example, the surfel data might indicate a low likelihood that there is a surface of an object at the particular location; e.g., there may not be a surfel in the surfel data that corresponds to the particular location, or there may be a surfel in the surfel data that corresponds to the particular location that has a low uncertainty measure, indicating a low confidence that there is a surface at the particular location. The sensor data, on the other hand, might indicate a high likelihood that there is a surface of an object at the particular location, e.g., if the sensor data includes a strong detection of an object at the particular location.

In some such cases, the generated object prediction for the particular location might indicate a high likelihood that there is a temporary object at the particular location, e.g., debris on the road or a trash can moved into the street. As a particular example, the object prediction might include a high uncertainty score, indicating a high likelihood that there is an object at the location, and a high 'temporary' class score corresponding to a 'temporary' semantic label, indicating a high likelihood that the object is temporary. In some other such cases, the generated object prediction for the particular location might indicate a low likelihood that there is an object at the particular location, because the system might assign a higher confidence to the surfel data than to the sensor data. That is, the system might determine with a high likelihood that the sensors identified an object at the particular location in error. In some other such cases, the generated object prediction for the particular location might indicate a high likelihood that there is an object at the particular location, because the system might assign a higher confidence to the sensor data than the surfel data. That is, the system might determine with a high likelihood that the surfel data is stale, i.e., that the surfel data reflects a state of the environment at a previous time point but does not reflect the state of the environment at the current time point.

As another example, the surfel data might indicate a high likelihood that there is a surface of an object at the particular location; e.g., there may be a surfel in the surfel data that corresponds to the particular location that has a high uncertainty measure. The sensor data, on the other hand, might indicate a low likelihood that there is a surface of an object at the particular location, e.g., if the sensor data does not include an detection, or only includes a weak detection, of an object at the particular location.

In some such cases, the generated object prediction for the particular location might indicate a high likelihood that there is an object at the particular location, but that it is occluded from the sensors of the vehicle. As a particular example, if there it is precipitating in the environment at the current time point, the sensors of the vehicle might only measure a weak detection of an object at the limits of the range of the sensors. In some other such cases, the generated object prediction for the location might indicate a high likelihood that there is a reflective object at the location. When an object is reflective, a sensor that measures reflected light, e.g., a LIDAR sensor, can fail to measure a detection of the object and instead measure a detection of a different object in the environment whose reflection is captured off of the reflective object, e.g., a sensor might observe a tree reflected off a window instead of observing the window itself. As a particular example, the object prediction might include a high uncertainty score, indicating a high likelihood that there is an object at the location, and a high 'reflective' class score corresponding to a 'reflectivity semantic label, indicating a high likelihood that the object is reflective. In some other such cases, the generated object prediction for the location might indicate a high likelihood that there is a transparent or semi-transparent object at the location. When an object is transparent, a sensor can fail to measure a detection of the object and instead measure a detection of a different object that is behind the transparent object. As a particular example, the object prediction might include a high uncertainty score, indicating a high likelihood that there is an object at the location, and a low 'opaque' class score corresponding to an 'opacity' semantic label, indicating a high likelihood that the object is transparent.

As another example, the surfel data and the sensor data might "agree." That is, they might both indicate a high likelihood that there is an object at a particular location, or they might both indicate that there is a low likelihood that there is an object at the particular location. In these examples, the object prediction for the particular location can correspond to the agreed-upon state of the world.

In some implementations, the system can use the class predictions for classes of semantic information in the surfel data to generate the object predictions. For example, In some implementations, the generated object prediction for each location in the environment also includes an updated class prediction for each of the classes of semantic information that are represented in the surfel data. As a particular example, if a surfel is labeled as "asphalt" with a high probability, and the sensor data captures a measurement directly above the surfel, then the system might determine that the measurement characterizes another object with high probability. On the other hand, if the surfel is labeled as "hedge" with high probability, and the sensor data captures a measurement directly above the surfel, then the system might determine that the measurement characterizes the same hedge, i.e., that the hedge has grown.

After generating the object predictions, the system can process the object predictions to generate a planned path for the vehicle (step 310). For example, the system can provide the object predictions to a planning subsystem of the system, e.g., the planning subsystem 150 depicted in FIG. 1, and the planning subsystem can generate the planned path. The system can generate the planned path in order to avoid obstacles that are represented in the object predictions. The planning subsystem can also use the class predictions for one or more of the classes of semantic information to make autonomous driving decisions, e.g., by avoiding portions of the road surface that have a likelihood of being icy.

As a particular example, the vehicle may be on a first street and approaching a second street, and a planned path of the vehicle instructs the vehicle to make a right turn onto the second street. The surfel data includes surfels representing a hedge on the left side of the first street, such that the hedge obstructs the sensors of the vehicle from being able to observe oncoming traffic moving towards the vehicle on the second street. Using this existing surfel data, before the vehicle arrives at the second street the planning subsystem might have determined to take a particular position on the first street in order to be able observe the oncoming traffic around the hedge. However, as the vehicle approaches the second street, the sensors capture sensor data that indicates that the hedge has grown. The system can combine the surfel data and the sensor data to generate a new object prediction for the hedge that represents its current dimensions. The planning subsystem can process the generated object prediction to update the planned path so that the vehicle can take a different particular position on the first street in order to be able to observe the oncoming traffic around the hedge.

Figure 4:
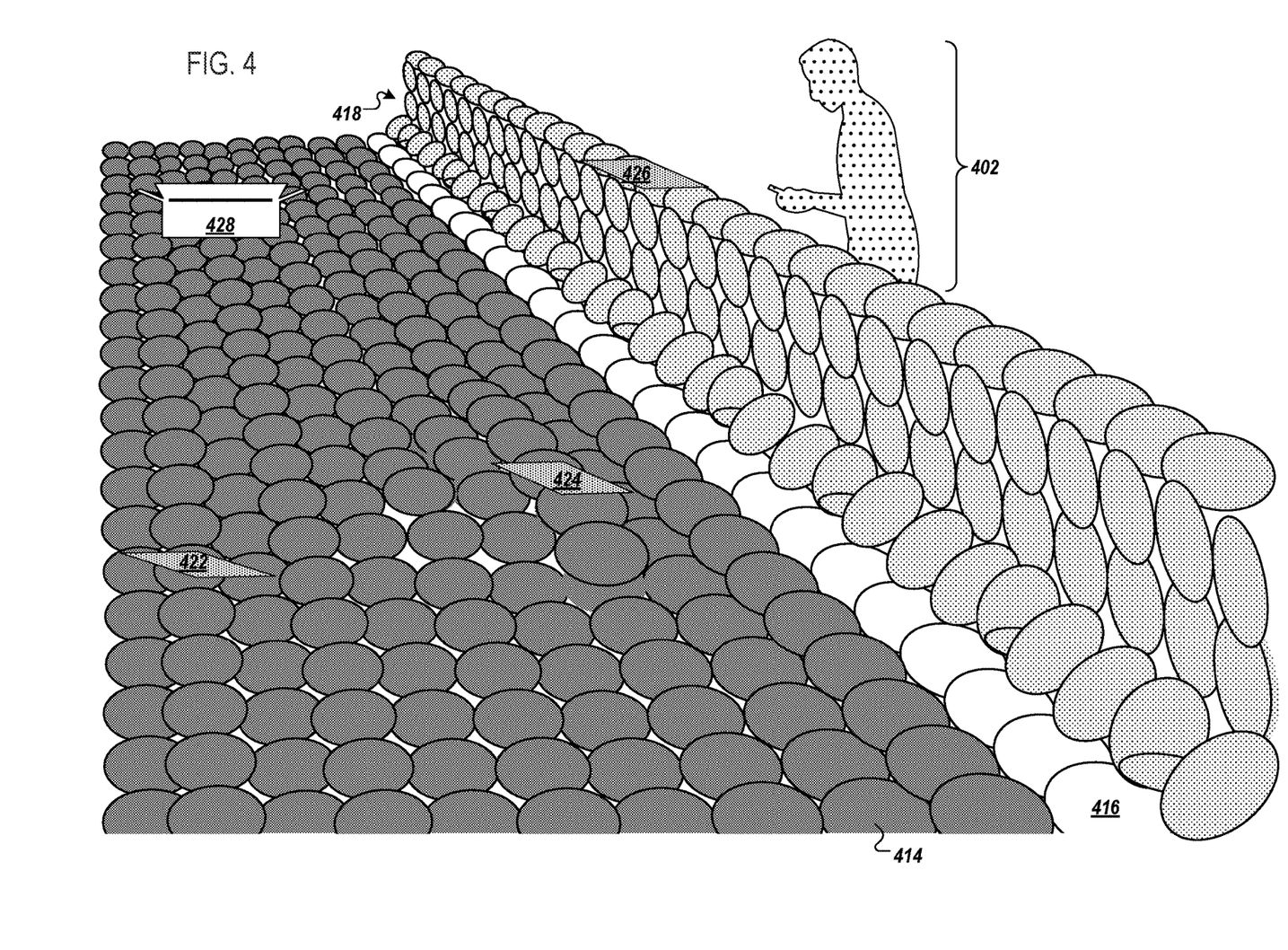
FIG. 4 is a diagram that illustrates how a surfel map can be used to improve foreign object detection.

FIG. 4 is a diagram that illustrates how a surfel map can be used to improve foreign object detection. FIG. 4 illustrates a surfel map having three different classes of surfels. Road surfels 414 represent different portions of a drivable surface, which in this example is a road. As described above, a system can consider the road surfels 414 to be part of a drivable surface by virtue of having labels that indicate they are drivable surfaces or because they are within a threshold distance of a path defined by a road graph.

Curb surfels 416 represent the surface of a curb. And barrier surfels 418 represent the surface of a barrier, e.g., a barrier that can prevent a pedestrian 402 from entering the roadway.

FIG. 4 also illustrates four foreign objects in the operating environment of the vehicle, which naturally do not have representations in the surfel map. These foreign objects include a medium-sized cardboard box 428, and three pieces of paper 422, 424, and 426.

It can be seen from the rich elevation data of the surfel map that the roadway is warped to have a deformity that peaks where the piece of paper 424 is located. This makes the piece of paper 424 appear at a significantly higher elevation than the piece of paper 422.

In addition, the piece of paper 426 that sits atop the barrier appears at a significantly higher elevation than either of the pieces of paper 422 or 424.

Using a surfel map for foreign object detection can allow the vehicle to quickly classify all three pieces of paper 422, 424, and 426 as foreign objects that do not need to be taken into consideration when path planning because of the mismatched reflection characteristics.

In addition to mismatched reflection characteristics, the system can also use elevation data in the surfel map to classify mismatched reflection characteristics as being caused by foreign objects that can be ignored for path planning. For example, the piece of paper 422 lies on the roadway 414. The system can compute a difference between an elevation of the roadway and the elevation of the detected piece of paper to determine that the piece of paper 422 can be ignored.

The piece of paper 424 has a higher elevation due to the deformity in the roadway. Thus, the piece of paper 424 has an elevation that is foot or more higher than the piece of paper 422. But because the surfel map also reflects such rich elevation data, a system can treat the piece of paper 424 exactly the same as the piece of paper 422 because they both are situated on the surface of a road way. In contrast, prior art systems may have classified the piece of paper 424 as being an item that must be planned around because if it's relatively high elevation.

The piece of paper 426 is not on the roadway, but it is still close enough that the sensor systems of the vehicle can take it into consideration. As illustrated, the piece of paper 426 is several feet off the surface of the roadway due to it being perched atop the barrier. Ordinarily, an object detected at such a height above the roadway would be an object that the vehicle would consider for path planning.

But because of the rich elevation data in the surfel map, the system can determine that the piece of paper 426 is a foreign object because there is virtually no difference in elevation between the piece of paper 426 and the top of the barrier. In contrast, a pedestrian 402 would not be treated the same way and would be taken into consideration when path planning.

The box 428 causes reflection mismatches with the road surfels 414. The box 428 has a greater elevation difference with the road surfels 414 than any of the pieces of paper 422 or 424. However, the elevation difference is still small enough for the box to be classified as a foreign object.

Nevertheless, the system can still take the greater height difference into account when path planning. For example, even though the vehicle could probably safely drive over the box 428, in the long run it is probably better for the vehicle to avoid boxes, unless other factors dictate that they be ignored. As one example, the vehicle could decide to avoid the box by planning a path to drive around it, unless oncoming traffic makes such a new path slow, unsafe, or otherwise undesirable.

In sum, the rich elevation data of a surfel map can be used both for classifying reflection mismatches as foreign objects in the first instance and also for making decisions about how to plan for them.

Figure 5:
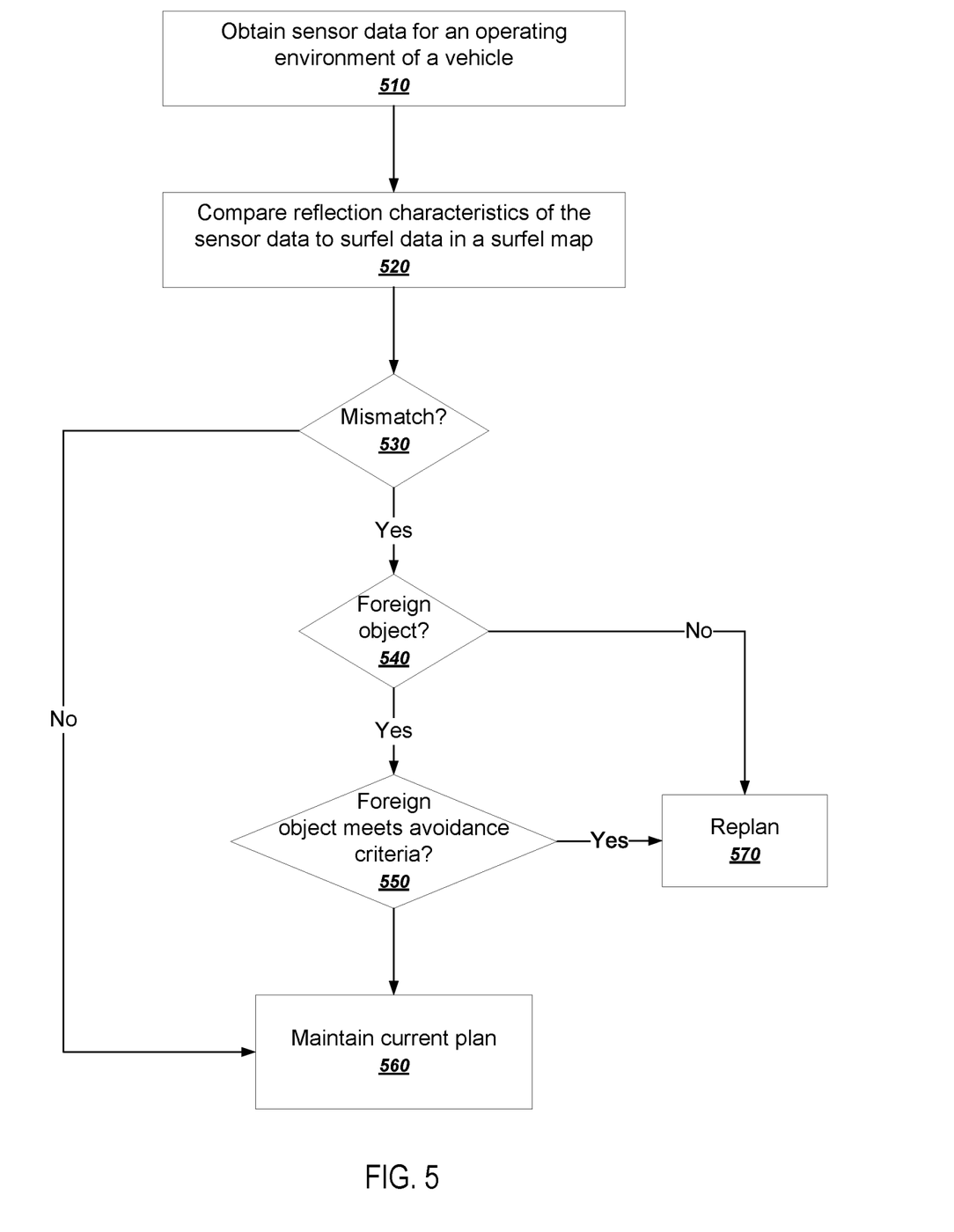
FIG. 5 is a flowchart of an example process for detecting and planning for foreign objects using a surfel map.

FIG. 5 is a flowchart of an example process for detecting and planning for foreign objects using a surfel map. The example process can for example be performed by an onboard computer system using sensor data received from onboard sensors. The example process will be described as being performed by a system of one or more computers.

The system obtains sensor data for an operating environment of a vehicle (510). As described above, the sensor data represents the reflection characteristics of one or more electromagnetic reflections captured by one or more onboard sensors of the vehicle. The sensor data can be captured by one or more sensors, e.g., cameras, radar, or lidar sensors, to name just a few examples.

The system compares reflection characteristics of the sensor data to surfel data in a surfel map (520). The system can compute the locations of surfels in the surfel map that correspond to locations of the reflection data. The system can then compare data associated with the identified surfels with the reflection characteristics of the sensor data. The system can compare any appropriate reflection characteristics, including the reflection characteristics described above. In some implementations, the system searches for reflection characteristic mismatches by analyzing surfels that are near drivable surfaces, e.g., surfels that are within a threshold distance of a drivable surface, or that themselves represent drivable surfaces.

The system determines whether there is a mismatch between the reflection characteristics and the surfel data (530). In this specification, a mismatch exists when a distance metric between reflection characteristics satisfies a threshold. Each reflection characteristic can have an appropriate distance function and a corresponding threshold that defines when the difference is a mismatch. For example, a color distance can be computed by computing an aggregated distance between pixel values of a color associated with a surfel and a color obtained by an onboard camera. The color distance can then be compared to a color threshold that is specific to identifying foreign objects.

If no mismatches are found, the system can simply maintain the current driving plan (branch to 560).

On the other hand, if a mismatch is found, the system can perform additional processing to determine if the mismatch is a foreign object or another kind of object (branch to 540).

As described above, in some implementations, the system can classify a reflection mismatch as a foreign object if the mismatch occurs on or near a drivable surface. As described above, the system can determine that the foreign object is on or near a drivable surface according to data associated with the mismatched surfels, by comparing a distance of the mismatch to a path in a road graph, or some combination of these.

In addition, the system can also compute a height difference between the surfel having the mismatch and the surface on which the object is located. The system can then classify reflection mismatches as foreign objects if the height difference is smaller than a threshold.

Alternatively or in addition, the system can classify an object as a foreign object by computing a size of the object and comparing the size to a size threshold. Thus, small boxes might be classified as foreign objects, but large boxes might not be. In some implementations, the system can quickly compute a rough size estimate for the object by computing how many contiguous surfels have the reflection mismatch.

For example, if four surfels have the same or a similar reflection mismatch, the system can use the distance from the current location of the vehicle to the surfels to quickly compute a rough size estimate of the object.

If the object is not a foreign object, e.g., because it is too large, the system replans the current path (branch to 570). For example, the vehicle can generate a new plan that applies the brakes or routes a path around the object.

If the object is a foreign object (540), the system determines whether the foreign object meets one or more avoidance criteria (550). If so, the system replans to avoid the foreign object (branch to 570). If not, the system simply ignores the foreign object and maintains the current plan (branch to 560).

The avoidance criteria can dictate whether a foreign object can be safely ignored, e.g., when it is very small, or when the foreign object should be planned around. In some implementations, the system uses the computed height difference as one of the avoidance criteria to replan for taller foreign objects and to ignore pieces of paper and leaves.

In addition, the system can also consider whether other vehicles are nearby in evaluating the avoidance criteria. For example, if there is oncoming traffic, the system can determine that the foreign object should not be avoided because doing so would be too disruptive to the driving plan, too unsafe to be worth the risk, or both. Thus, in difference driving situations, the system can treat the same foreign object in different ways depending on the evaluation of the avoidance criteria. This capability illustrates the benefit of using the surfel map for foreign object detection—it provides the system with the option of avoiding a foreign object if circumstances permit but also providing the planning option of simply ignoring it.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving sensor data representing reflection characteristics of electromagnetic waves in an operating environment of an autonomous vehicle;
  obtaining a surfel map representing a portion of the operating environment of the autonomous vehicle, wherein a plurality of surfels in the surfel map are associated with reflection data representing one or more reflection characteristics of a surface in the operating environment represented by the surfel;
  determining that the reflection data includes one or more mismatched reflection characteristics for a particular surfel in the surfel map; and
  in response, detecting a foreign object at a location corresponding to the particular surfel having the one or more mismatched reflection characteristics.

Embodiment 2 is the method of embodiment 1, wherein determining that the reflection data includes one or more mismatched reflection characteristics comprises analyzing surfels that are near a drivable surface of the surfel map.

Embodiment 3 is the method of any one of embodiments 1-2, wherein determining that the reflection data includes one or more mismatched reflection characteristics comprises analyzing surfels that represent a drivable surface.

Embodiment 4 is the method of any one of embodiments 1-3, further comprising determining that the particular surfel represents a drivable surface including determining that the particular surfel is associated with a label indicating a drivable surface.

Embodiment 5 is the method of any one of embodiments 1-4, further comprising determining that the particular surfel represents a drivable surface including determining that the particular surfel has a location that is within a threshold distance of a path on a road graph.

Embodiment 6 is the method of any one of embodiments 1-5, further comprising:
  updating a driving plan for the autonomous vehicle to account for the foreign object.

Embodiment 7 is the method of any one of embodiments 1-6, further comprising:
  determining, by a planning subsystem of the autonomous vehicle, that the foreign object does not require a modification to a current driving plan.

Embodiment 8 is the method of embodiment 7, further comprising executing, by the autonomous vehicle, the current driving plan that causes the vehicle to ignore the foreign object despite the mismatch of reflection characteristics.

Embodiment 9 is the method of any one of embodiments 1-8, wherein determining that the reflection data contains one or more mismatched reflection characteristics for a particular surfel in the surfel map comprises determining that a measure of reflectivity for the location does not match reflectivity data associated with the particular surfel.

Embodiment 10 is the method of any one of embodiments 1-9, wherein determining that the reflection data contains one or more mismatched reflection characteristics for a particular surfel in the surfel map comprises determining that a color for the location does not match color data associated with the particular surfel.

Embodiment 11 is the method of any one of embodiments 1-10, wherein determining that the reflection data contains one or more mismatched reflection characteristics for a particular surfel in the surfel map comprises determining that a detected orientation of a surface at the location does not match an orientation of the particular surfel.

Embodiment 12 is the method of any one of embodiments 1-11, wherein detecting the foreign object comprises:
detecting a top of the object corresponding to the mismatched reflection characteristics;
computing a height between an elevation of the particular surfel and the top of the object;
determining that the height is less than a threshold height for foreign objects.

Embodiment 13 is the method of any one of embodiments 1-12, further comprising:
evaluating one or more avoidance criteria for the foreign object; and
updating the driving plan based on the evaluation of the one or more avoidance criteria.

Embodiment 14 is the method of any one of embodiments 1-13, further comprising:
evaluating one or more avoidance criteria for the foreign object; and
maintaining a current driving plan based on the evaluation of the one or more avoidance criteria.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
receiving sensor data representing reflection characteristics of electromagnetic waves in an operating environment of an autonomous vehicle;
obtaining a surfel map representing a portion of the operating environment of the autonomous vehicle, wherein a plurality of surfels in the surfel map are associated with reflection data representing one or more reflection characteristics of a surface in the operating environment represented by the surfel map;
computing a reflection distance between (i) reflection characteristics of surfaces in the operating environment detected by the sensor data and (ii) reflection characteristics of surfels in the surfel map representing the surfaces in the operating environment detected by the sensor data;
determining that the reflection distance between (i) reflection characteristics of a surface detected by the sensor data and (ii) reflection characteristics of a surfel in the surfel map representing the surface detected by the sensor data satisfies a threshold; and
in response, detecting a foreign object at a location in the operating environment corresponding to the surfel in the surfel map, wherein detecting the foreign object comprises:
detecting, from the sensor data, an elevation of the surface corresponding to the reflection characteristics having the reflection distance that satisfies the threshold;
obtaining, from the surfel map, an elevation of the surfel corresponding to the surface detected by the sensor data; and
computing a height difference between the elevation of the surfel and the elevation of the surface.

2. The method of claim 1, wherein determining that the reflection distance satisfies the threshold comprises analyzing surfels that are within a threshold distance of a drivable surface of the surfel map.

3. The method of claim 1, wherein determining that the reflection distance satisfies the threshold comprises analyzing surfels that represent a drivable surface.

4. The method of claim 1, further comprising determining that the surfel represents a drivable surface including determining that the surfel is associated with a label indicating a drivable surface.

5. The method of claim 1, further comprising determining that the surfel represents a drivable surface including determining that the surfel has a location that is within a threshold distance of a path on a road graph.

6. The method of claim 1, further comprising:
updating a driving plan for the autonomous vehicle to account for the foreign object.

7. The method of claim 1, further comprising:
determining, by a planning subsystem of the autonomous vehicle, that the foreign object does not require a modification to a current driving plan.

8. The method of claim 7, further comprising executing, by the autonomous vehicle, the current driving plan that causes the vehicle to ignore the foreign object despite the distance metric satisfying the threshold.

9. The method of claim 1, wherein determining that the reflection distance satisfies the threshold comprises determining that a reflectivity distance between (i) a measure of reflectivity for the location and (ii) a measure of reflectivity associated with the surfel is above a threshold reflection distance.

10. The method of claim 1, wherein determining that the reflection distance satisfies the threshold comprises determining that a color distance between (i) a color obtained by a camera for the location and (ii) a color associated with the surfel is above a threshold color distance.

11. The method of claim 1, wherein determining that the reflection distance satisfies the threshold comprises determining that an orientation distance between (i) a detected orientation of a surface at the location and (ii) an orientation of the surfel is above a threshold orientation distance.

12. The method of claim 1, wherein detecting the foreign object further comprises:
    determining that the height difference is less than a threshold height difference for foreign objects.

13. The method of claim 1, further comprising:
    evaluating one or more avoidance criteria for the foreign object; and
    updating the driving plan based on the evaluation of the one or more avoidance criteria.

14. The method of claim 1, further comprising:
    evaluating one or more avoidance criteria for the foreign object; and
    maintaining a current driving plan based on the evaluation of the one or more avoidance criteria.

15. A system comprising:
    one or more computers and one or more storage devices storing instructions that are operable, when executed by the one or more computers, to cause the one or more computers to perform operations comprising:
    receiving sensor data representing reflection characteristics of electromagnetic waves in an operating environment of an autonomous vehicle;
    obtaining a surfel map representing a portion of the operating environment of the autonomous vehicle, wherein a plurality of surfels in the surfel map are associated with reflection data representing one or more reflection characteristics of a surface in the operating environment represented by the surfel map;
    computing a reflection distance between (i) reflection characteristics of surfaces in the operating environment detected by the sensor data and (ii) reflection characteristics of surfels in the surfel map representing the surfaces In the operating environment detected by the sensor data;
    determining that the reflection distance between (i) reflection characteristics of a surface detected by the sensor data and (ii) reflection characteristics of a surfel in the surfel map representing the surface detected by the sensor data satisfies a threshold; and
    in response, detecting a foreign object at a location in the operating environment corresponding to the surfel in the surfel map, wherein detecting the foreign object comprises:
        detecting, from the sensor data, an elevation of the surface corresponding to the reflection characteristics having the reflection distance that satisfies the threshold;
        obtaining, from the surfel map, an elevation of the surfel corresponding to the surface detected by the sensor data; and
        computing a height difference between the elevation of the surfel and the elevation of the surface.

16. The system of claim 15, wherein determining that the reflection distance satisfies the threshold comprises analyzing surfels that are within a threshold distance of a drivable surface of the surfel map.

17. The system of claim 15, wherein determining that the reflection distance satisfies the threshold comprises analyzing surfels that represent a drivable surface.

18. The system of claim 15, wherein the operations further comprise determining that the surfel represents a drivable surface including determining that the surfel is associated with a label indicating a drivable surface.

19. The system of claim 15, wherein the operations further comprise determining that the surfel represents a drivable surface including determining that the surfel has a location that is within a threshold distance of a path on a road graph.

20. One or more non-transitory computer storage media encoded with computer program instructions that when executed by one or more computers cause the one or more computers to perform operations comprising:
    receiving sensor data representing reflection characteristics of electromagnetic waves in an operating environment of an autonomous vehicle;
    obtaining a surfel map representing a portion of the operating environment of the autonomous vehicle, wherein a plurality of surfels in the surfel map are associated with reflection data representing one or more reflection characteristics of a surface in the operating environment represented by the surfel map;
    computing a reflection distance between (i) reflection characteristics of surfaces in the operating environment detected by the sensor data and (ii) reflection characteristics of surfels in the surfel map representing the surfaces In the operating environment detected by the sensor data;
    determining that the reflection distance between (i) reflection characteristics of a surface detected by the sensor data and (ii) reflection characteristics of a surfel in the surfel map representing the surface detected by the sensor data satisfies a threshold; and
    in response, detecting a foreign object at a location in the operating environment corresponding to the surfel in the surfel map, wherein detecting the foreign object comprises:
        detecting, from the sensor data, an elevation of the surface corresponding to the reflection characteristics having the reflection distance that satisfies the threshold;
        obtaining, from the surfel map, an elevation of the surfel corresponding to the surface detected by the sensor data; and
        computing a height difference between the elevation of the surfel and the elevation of the surface.

* * * * *